United States Patent [19]

Contello

[11] Patent Number: 4,541,364
[45] Date of Patent: Sep. 17, 1985

[54] ANIMAL RESTRAINT APPARATUS

[76] Inventor: Michael Contello, 3732 Glen Haven, Houston, Tex. 77025

[21] Appl. No.: 587,808

[22] Filed: Mar. 9, 1984

[51] Int. Cl.⁴ ............................................. A01K 27/00
[52] U.S. Cl. ..................................... 119/109; 119/110
[58] Field of Search ................. 119/109, 106, 96, 110, 119/111, 112, 114

[56] References Cited

U.S. PATENT DOCUMENTS 3,104,650 9/1963 Grahling .......................... 119/109 X
3,605,384 9/1971 Pacini ................................ 119/96 X
3,884,190 5/1975 Gurrey ................................ 119/109
4,182,272 1/1980 Taff ................................... 119/109 X
4,407,233 10/1983 Bozzacco ............................ 119/106

Primary Examiner—Hugh R. Chamblee
Attorney, Agent, or Firm—Carwell & Helmreich

[57] ABSTRACT

Animal restraint apparatus for use in restraining domestic animals having an elongate uniformly stretching elastomeric member, a selectively releasable eyelet attached thereto at the distal end adapted for interconnection to a dog collar or the like, and a quick release strap means interconnected at the proximal end of the elastomeric member.

4 Claims, 3 Drawing Figures

ANIMAL RESTRAINT APPARATUS

BACKGROUND OF THE INVENTION

1. Field of the Invention

This invention relates to animal restraint apparatus, and more particularly, to such restraint apparatus comprising a leash or the like for use in restraining domestic animals.

2. Prior Art

Devices such as dog leashes and the like for use by humans to restrain animals have been widely available for some time and have found general acceptance. However, such apparatus often suffer from several undesirable features.

First, in some applications, particularly when rather large animals are being restrained, it is imperative to provide for an automatic quick-release feature, and even a backup release feature, whereby the leash may rapidly be released from the human as, for example, when the animal might lunge or otherwise pull its master into a dangerous environment, such as the path of an oncoming automobile. Other prior art animal restraint devices have been deficient in providing such a feature while at the same time, being safe, of relatively simple and economical construction, and yet effective.

Yet another serious problem with previous attempts to provide suitable animal restraint apparatus relates to the behavioral characteristics of animals themselves. It is often difficult to prevent restrained animals from making frequent turns and, accordingly, restraint devices of the prior art suffered notoriously from the defect of becoming entangled, snarled, and twisted due to activities of the animal.

Still further, it was long felt desirable to keep a restrained animal relatively close to its master and, yet, to provide a limited amount of freedom of movement. However, these two objectives were often found to be contradictory, whereby either leashes were designed which were too short, thus restricting movement, or too long, thereby resulting in the aforementioned problems with snarling of the restraint, movement of the animal into dangerous situations, and the like.

There was, accordingly, also a need for a restraint device which could gradually communicate to the animal the degree to which it was being permitted additional freedom of movement.

Moreover, many animals, when attempting to travel beyond the full extension of the restraint device too rapidly often would become seriously injured by being choked or having their necks snapped backwards. Thus, a means was further desired for preventing such occurrences while simultaneously preventing the animal from straying too far.

SUMMARY OF THE INVENTION

It is therefore an object of the present invention to provide an improved animal restraint device.

Another object of the present invention is to provide an animal restraint device having a quick release safety feature.

A further object of the present invention is to provide an improved animal restraint device which would effectively reduce entanglement due to animal activity.

Still another object of the present invention is to provide an improved animal restraint apparatus which would provide gradually restricted freedom of movement of the restrained animal and which substantially reduced injury to the animal upon such restraint.

The above and other objects of the present invention will become apparent from the drawings, the description given herein and the appended claims.

In one embodiment, the invention pertains to an animal restraint apparatus comprising an elongate elastomeric member having an eyelet attached at the distal end thereof for releasable attachment to an animal collar or the like. At the proximal end of the elastomeric member a second union joint and second engagement means are attached which, in turn, have a first engagement means and first union joint attached thereto.

The first engagement means is, in turn, attached to a quick release strap means for placement about the wrist of the individual restraining the animal. The strap means has first and second end surface portions comprised of a synthetic material such as a VELCRO ® brand material or the like having the property that the first and second portions adhere to one another when pressed together and yet may be quickly released if desired.

The first engagement means and union joint are disposed from the second union joint and engagement whereby they may rotate about a common co-axis. In like manner, the eyelet is attached to an eyelet base which is, in turn, disposed from a distal loop portion of the elastomeric member whereby the eyelet may also rotate about an axis common to the eyelet base and eyelet. In this manner, snarling or entanglement of the elastomeric member by movement of the restrained animal even in 360° turns or the like is substantially reduced, inasmuch as the elastomeric member, by means of the pivoting relationship between the first and second union joints at the proximal end and the pivoting relationship between the eyelet base and eyelet at the distal end of the elastomeric member does not twist about its axis during such movement.

The elastomeric member is attached to the second engagement means by means of a proximal loop formed in the end of the elastomeric member having a loop retention means disposed about the end of the loop. In like manner, the elastomeric member is attached to the eyelet base by means of a distal loop extending therethrough and having a loop retention means disposed about the member. The inside diameters of the loop retention means are selected whereby excess stretching force such as that caused by a dangerous lunging of the animal. In the longitudinal direction of the elastomeric member may cause either the quick release strap means at the proximal end to release by causing the first and second end portions to separate, and/or one or both of the loop portions of the elastomeric member to separate when a portion of the elastomeric member is pulled free of the loop retention means.

Due to the elastic and resilient nature of the elastomeric member, the member will stretch in its coaxial direction thereby extending its length as the animal seeks to travel beyond the quiescent length of the member. However, as the member stretches, a like increasing restraining force is exerted upon the animal seeking to restore the member to its quiescent length, thereby gradually and safely communicating to the restrained animal the maximum desired limitation to the animal's freedom of travel. Moreover, the resilient nature of the member prevents choking of the animal when movement beyond the quiescent length of the elastomeric member is attempted. Accordingly, the elastomeric member is selected to have a coefficient of elasticity functionally related to the animal size and desired additional range of movement of the animal and like parameters.

BRIEF DESCRIPTION OF THE DRAWINGS

The invention may be more fully understood by reference to the following description of a preferred embodiment in conjunction with the drawings, wherein.

DESCRIPTION OF THE PREFERRED EMBODIMENT

While the invention will be described with particular reference to an animal restraint apparatus adapted particularly to domestic animals typically of the size of dogs and cats, it is to be understood that it is not so limited. The animal restraint apparatus described herein may also be desirably employed in the safe and effective restraint of a wide range of animals and may further be successfully employed not only in situations where the animal is being taken for a walk but, rather, in any situation or location wherein an animal is desired to be safely and effectively restrained.

Figure 1:
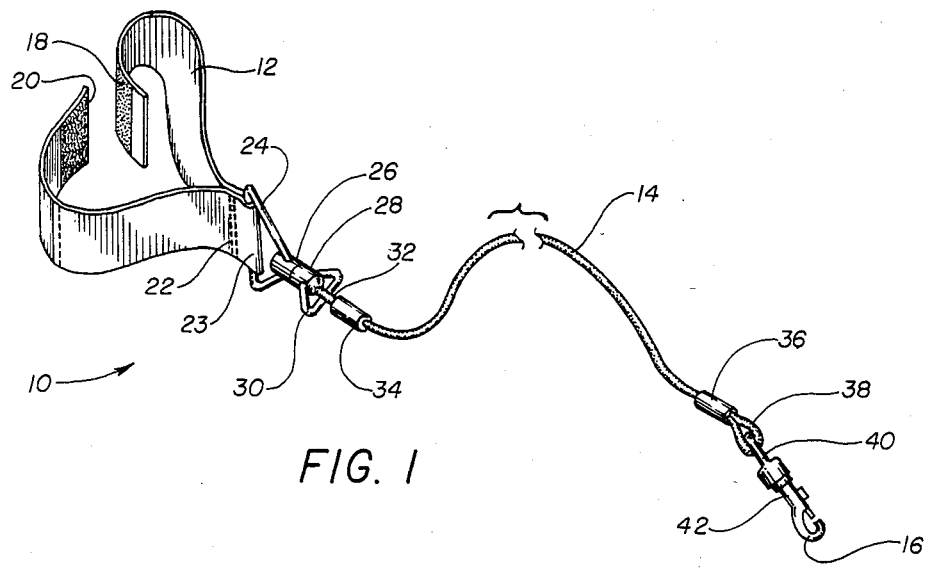
FIG. 1 is a pictorial view of an animal restraint apparatus constructed in accordance with the present invention.

Referring first to FIG. 1, there is shown depicted therein generally an animal restraint apparatus 10 comprising a preferred embodiment of the present invention. The apparatus is typically adapted for connection at one end to an animal to be restrained (not shown) which has a collar about the neck with an appropriate ring or hook-type connector and at the other end to the restraining body which may be either a human being, a fixed pole, or other like member.

Referring more particularly to FIG. 1, it will be noted that the restraint apparatus 10 preferably includes a quick release strap means 12 to be connected to the human or other restraint means, an elastomeric member 14 connected at its proximal end in a manner to be hereinafter described in more detail to the quick release strap means 12, and a ring portion 16 to be connected to the animal and disposed from the elastomeric member 14 also in a manner to be hereinafter described in greater detail.

The quick release strap means preferably includes a first end portion 18 and a second end portion 20 disposed on the surface of the strap means 12 and comprised of a synthetic fastener material such as the VELCRO ® brand fastener material having the property that when the material is pressed together it will adhere and yet can be readily pulled apart upon providing the appropriate amount of separating pressure. The strap means 12 is adapted to be placed about the wrist of the restraining individual whereupon the first and second end portions are pressed together, thereby releasably retaining the strap means 12 about the wrist of the restraining individual. At the other end of the strap means 12 a portion thereof is formed into a loop by a strap loop 23 forming means 22 such as stitching or the like.

Extending through the loop 23 of the strap means 12 is a first engagement means 24 which, in turn, is interconnected to a first union joint 26. A second union joint 28 is pendantly disposed from the first joint 26 and has attached thereto a second engagement means 30 also in the form of a triangular member defining an aperture therethrough. The first and second union joints 26 and 28, respectively, are interconnected whereby they may rotate relative to one another about a common co-axis. A proximal portion of the elastomeric member 14 is extended through the aperture defined by the second engagement means and looped back on itelf forming a proximal loop 32 portion, and has a loop retention means 34 extending about both thicknesses of the elastomeric member 14.

At the distal end of elastomeric member 14, a like distal loop 38 is formed in the elastomeric member 14 by looping a portion thereof back on itself and then disposing about both thicknesses of the elastomeric member 14 a like loop retention means 36. It will be appreciated that in a preferred embodiment loop retention means 34 and 36 will take the form of a plastic shrink tubing collar which, upon disposition about member 14 and application of heat, will tightly but releasably adhere about member 14. An eyelet base 40 defines an aperture therethrough through which the distal loop 38 portion of elastomeric member 14 extends. An eyelet 42 is pendantly disposed from the eyelet base 40 whereby the eyelet 42 may, in like manner to first and second union joints 26 and 28, respectively, rotate relative to eyelet base 40 about an axis common to both.

The eyelet 42 includes a ring portion 16 and a shaft 46 which, when normally disposed in the closed position, defines an aperture through the eyelet 42 through which the ring or connector on the collar of the animal (not shown) may extend to connect the animal to the eyelet 42. Eyelet 42 is further provided with an eyelet control means 44 interconnected to shaft 46 whereby a break in the ring portion 16 of eyelet 42 may be effected by movement of the eyelet 44. This movement moves the shaft 46 to an opened position whereby the ring or connector on the collar of the animal to be restrained may be released from the eyelet 42.

In the foregoing apparatus of the present invention just described, it will be appreciated that due to the relative coaxial motion permitted between the eyelet base 40 and eyelet 42 on the one hand, and between first and second union joints 26 and 28, rotation of the ring portion 16 caused by movement of the animal will not be substantially transmitted to the elastomeric member 14 so as to cause curling, snarling, twisting, and the like of the elastomeric member 14 which has been quite a problem with respect to restraint devices of the prior art.

Yet another feature of the apparatus just described relates to the redundancy provided in safety features. For example, it is not uncommon for a restrained animal to make dangerous movements such as lunges into dangerous situations which might otherwise place the restraining individual in a like-dangerous environment. If the animal makes such a lunge attempting to extend the length of the elastomeric member 14 beyond a predetermined permissible safe length, the animal will be disconnected from the individual by the apparatus provided herein by means of the quick release strap means 12 disconnecting by separation of end portions 18 and 20, by disconnection of elastomeric member 14 from engagement means 30 in a manner to be described, or by disconnection of the distal loop 38 of elastomeric member 14 from the eyelet base 40, also in a manner to be described.

Figure 2:
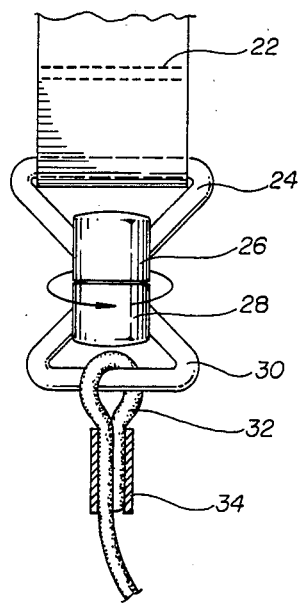
FIG. 2 is an enlarged view of the proximal end portion of the animal restraint apparatus of FIG. 1.
Figure 3:
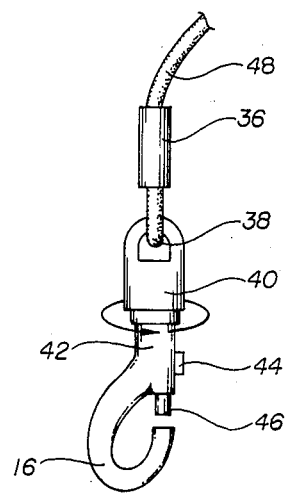
FIG. 3 is an enlarged view of the distal end portion of the animal restraint apparatus of FIG. 1.

Regarding such disconnection, it will be noted from FIG. 2 that the proximal loop 32 (as well as the distal loop 38) may be desirably formed by looping back a portion of elastomeric member 14 on itself thereby forming a portion having a cross-sectional width of twice the outer diameter of elastomeric member 14. As previously noted, the member 14 is fashioned of a compressible resilient material. Thus loop retention means 34 which releasably forms about the proximal and distal loops 32 and 38 may desirably be selected to have an annulus therethrough having an inner diameter less than twice the outer diameter of elastomeric member 14. In this manner, the loop retention means 34 will provide an axial pressure inwards thereby compressing the two parallel portions of member 14 retainedly together. However, it will be appreciated that if the coaxial force imparted on elastomeric member 14 by the animal exceeds a desired amount, a portion of the member 14 may be pulled through the loop retention means 34 or 36, whereupon the respective proximal and distal loops 32 or 38 are no longer present, thereby freeing the respective end of the elastomeric member 14 through the respective second engagement means 30 or eyelet base 40.

The elastomeric member 14 is desirably comprised of a resilient material with memory such as rubber or plastic or the like which will tend to provide a restoring force when extended in its axial direction. It will thereby be appreciated that such a property will permit the restrained animal to extend to a distance exceeding the non-stretched elongate length of the member 14. However, as the animal so extends or stretches the member 14, an increasing restorative force is imparted to the animal which is directly related to the "spring constant" or coefficient of elasticity of the member 14, thereby communicating automatically to the restrained animal that the animal is approaching the desired limit of its extended freedom of movement. Yet an additional benefit of such apparatus is that the familiar situation in which the animal is choked by attempting to move beyond the length limits of a conventional and relatively non-stretchable leash, typically fashioned of leather or the like, is thereby avoided.

One additional feature of the elastomeric material comprising the member 14 is that it will desirably include a reflective means 48 such as an outer luminescent or reflective coating or, more desirably, a plurality of metallic light reflecting flakes embedded in the elastomeric material, thereby enhancing the safety features of the apparatus of the present invention. More particularly, in applications wherein animals are walked in close proximity to moving traffic, as but one example, such reflective means 48 will enhance the ability of drivers of vehicles to perceive the individual and the restrained animal.

It will be noted that the hereinbefore mentioned features of redundant safety release and gradual increasing restraining force are interrelated. For example, the loop retention means 34 could be selected to have an inside diameter so substantially close to twice the outer diameter of the elastomeric member 14 whereby one or both of the proximal and distal loops 32 and 38 might be released long before the beneficial feature of the increasing restraining force brought to bear by the elastomeric member 14 is enjoyed. Conversely, and in like manner, if the member 14 is comprised of a material having very little stretching ability, even with substantial forces exerted thereon, the loops 32 and 38 may prematurely release (or even the first and second end portions 18 and 20), even if the inner diameter of the annulus of loop retention means 34 is substantially smaller than twice the outer diameter of elastomeric member 14.

Similarly, elastomeric member 14 could be fashioned of a material having such a great degree of stretch that a restrained animal could be permitted to extend member 14 to a substantially longer, dangerous length prior to the restorative force increasing to the point whereby the animal is discouraged from further extending its length or prior to the hereinbefore noted release features of strap means 12 and loops 32 and 38 taking effect.

Accordingly, it is a feature of the present invention to select the composition of the elastomeric member 14, the relative outer dimension thereof, and the inner dimension of loop retention means 34, as well as the size, weight and the like of the animal to be restrained in functional relation to one another whereby the animal is permitted to extend the length of member 14 to a predetermined additional length (which may vary as desired) and thereafter effect release of the restraint apparatus for safety reasons as hereinbefore noted.

While particular embodiment of the present invention have been shown and modified, it will be apparent to those skilled in the art that minor changes and modifications may be made therein without departing from the true scope and spirit of the invention.

What is claimed is:

1. Animal restraint apparatus for use in restraining domestic animals of the feline or canine variety or the like, comprising:
   an elongate, uniformly stretching elastomeric member having
      a proximal loop portion; and
      a distal loop portion;
   an eyelet base interconnected to said distal loop;
   a selectively releasable eyelet in coaxial alignment with said base about a first co-axis, said eyelet being pendantly disposed from said base and having movement relative to said base restricted to rotation substantially about said first co-axis;
   a quick release strap having a loop forming means defining a strap loop, said quick release strap comprising:
      a first end portion having a first synthetic material surface; and
      a second end portion having a second synthetic material surface which matingly and releasably adheres to said first surface when said first and said second surfaces are pressed together;
   said elastomeric member being substantially solid and having an outer exposed surface extending substantially the length of said elastomeric member; and
   said elastomeric member further including light reflective means for enhancing visibility of said member embedded in said elastomeric member;
   said first and second synthetic surfaces of said quick release strap having a force required to effect said releasing which is preselected in functional relation to said stretching of said elastomeric member;
   a first engagement means interconnected to said strap loop and having a first union joint;
   a second engagement means interconnected to said proximal loop and having a second union joint,
   said first and second engagement means being in coaxial alignment about a second co-axis and interconnected adjacent said first and said second union joints, and having relative movement restricted to rotation substantially about said second co-axis.

2. An animal restraint apparatus comprising:

an elongate, uniformly stretching elastomeric member having
   a proximal loop portion; and
   a distal loop portion;

an eyelet base interconnected to said distal loop;

a selectively releasable eyelet in coaxial alignment with said base about a first co-axis, said eyelet being pendantly disposed from said base and having movement relative to said base restricted to rotation substantially about said first co-axis;

a quick release strap having a loop forming means defining a strap loop;

a first engagement means interconnected to said strap loop and having a first union joint;

a second engagement means interconnected to said proximal loop and having a second union joint, said first and second engagement means being in co-axial alignment about a second co-axis and interconnected adjacent said first and said second union joints, and having relative movement restricted to rotation substantially about said second co-axis;

said quick relese strap comprising:
   a first end portion having a first synthetic material surface; and
   a second end portion having a first synthetic material surface which matingly and releasably adheres to said first surface when said first and said second surfaces are pressed together;

said elastomeric member being substantially solid and having an outer exposed surface extending substantially the length of said elastomeric member;

said elastomeric member further including light reflective means for enhancing visibility of said member embedded in said elastomeric member;

said first and second synthetic surfaces of said quick release strap having a force required to effect said releasing which is preselected in functional relation to said stretching of said elastomeric member;

said reflective means comprises a plurality of metallic flakes;

said eyelet includes
   a ring portion;
   a shaft; and
   an eyelet controlled means interconnected to said shaft for moving said shaft between an opened and closed position,
   said shaft and said ring portion defining a closed ring having a aperture therethrough when said shaft is in said closed position and further defining an open ring when said shaft is in said opened position;

said first union joint rotates with said first engagement means relative to said second union joint and said second engagement means; and a plurality of loop retention means each disposed about said elastomeric member and adjacent a respective one of said proximal and distal loops, for releasing said member from at least one of said second engagement means or said eyelet base, respectively, in response to a predetermined stretching force exerted on said elastomeric member.

3. The apparatus of claim 2, wherein said elastomeric member has an outside diameter, each of said loop retention means has an annulus defining an inner diameter, and wherein said inner diameter is less than twice said outside diameter.

4. The apparatus of claim 3, wherein a portion of said first engagement means extends through said strap loop.

* * * * *